United States Patent [19]

Torchard

[11] Patent Number: 5,405,062
[45] Date of Patent: Apr. 11, 1995

[54] ROTARY PRODUCT SUPPLY AND DISCHARGE DISTRIBUTORS

[75] Inventor: Michel Torchard, Persan, France

[73] Assignee: Nestec S.A., Vevey, Switzerland

[21] Appl. No.: 104,815

[22] Filed: Aug. 10, 1993

[30] Foreign Application Priority Data

Sep. 9, 1992 [EP] European Pat. Off. ............ 92115382

[51] Int. Cl.⁶ .............................................. G01F 11/10
[52] U.S. Cl. .................................. 222/368; 251/152; 251/164; 251/315.01
[58] Field of Search ............... 222/368, 452, 444, 410, 222/416; 277/81 R, 168, 169; 251/152, 161, 164, 171, 167, 315 R; 137/625.22

[56] References Cited

U.S. PATENT DOCUMENTS

| | | | |
|---|---|---|---|
| 2,399,472 | 4/1946 | de la Roza | 222/368 |
| 2,538,320 | 1/1951 | Mylting | 222/368 |
| 3,446,404 | 5/1969 | Mehta | 222/225 |
| 3,681,192 | 8/1972 | Reinhall | 162/246 |
| 3,888,460 | 6/1975 | Sigmon | 251/152 |
| 3,895,776 | 7/1975 | Laurens | 251/152 |
| 4,449,194 | 5/1984 | Hobart et al. | 251/171 |
| 4,458,878 | 7/1984 | Tsuno | 251/152 |
| 4,815,704 | 3/1989 | Berchem | 251/171 |
| 5,163,656 | 11/1992 | Sigmon | 222/452 |

FOREIGN PATENT DOCUMENTS

| | | |
|---|---|---|
| 0124345 | 11/1984 | European Pat. Off. . |
| 2012300 | 7/1969 | France . |
| 3145781 | 5/1983 | Germany . |
| 47556 | 12/1963 | Luxembourg . |
| 2024158 | 1/1980 | United Kingdom ................ 222/368 |

*Primary Examiner*—Andres Kashnikow
*Assistant Examiner*—Philippe Derakshani
*Attorney, Agent, or Firm*—Vogt & O'Donnell

[57] ABSTRACT

A rotary distributor for the supply and discharge of products has a rotor member having a recessed cell compartment and is mounted rotatably in a casing. The casing has two sleeve members which are positioned slidably in two bore openings in the casing to provide, upon rotation of the rotor member, a product inlet to the rotor cell compartment and a product outlet from the compartment. Each inlet and outlet sleeve member is formed by a coupling flange member and a seal member which are positioned so that the seal member is positioned between the coupling flange member and rotor member, and each seal member has a portion configured and positioned for bearing on the rotor member. The coupling flange member of each sleeve member is mounted to the casing adjustably for mounting each sleeve member slidably towards and away from the rotor member for adjusting a frictional force between each seal member and the rotor member.

20 Claims, 3 Drawing Sheets

ROTARY PRODUCT SUPPLY AND DISCHARGE DISTRIBUTORS

BACKGROUND OF THE INVENTION

The present invention relates to a device for the supply and discharge, of powder products and relates more particularly to a rotary distributor having improved leak-tightness.

French Patent Specification 2 012 300 discloses a chute distributor for the supply and discharge of finely divided products in a tank.

The rotary distributor described comprises a rotor formed with at least one cell and supported by rotation means, such as journals, mounted on a casing provided with tubular sleeves for supplying and discharging the product, each cell being disposed such that it communicates, while the rotor rotates, with these supply and discharge sleeves.

The interior of the distributor is sealed against the external atmosphere by means of fixed supply and discharge sleeves and by means of at least one packing box.

SUMMARY OF THE INVENTION

An aim of the present invention is to provide a rotary distributor, which implements a new sealing principle making it possible to facilitate and improve the leak-tightness of the distributor with respect to the external atmosphere.

An object of the present invention is a rotary distributor comprising a rotor comprising at least one cell, a casing provided with supply and discharge sleeves for powder products, the rotor moving in rotation with respect to the casing, each cell being disposed so that it communicates, successively and after rotation of the rotor, with the supply sleeve and then with the discharge sleeve, characterized in that these supply and discharge sleeves are disposed in the casing in a sliding manner and in that the distributor comprises, on the one hand, two sealing members mounted in permanent friction on the rotor, whose longitudinal axes are perpendicular to the axis of rotation of the rotor and, on the other hand, means for adjusting the force of this friction.

According to a particular embodiment, the rotary distributor comprises two sealing members each formed by an annular wear ring, whose surface bearing against the supply or discharge sleeve is plane and whose surface in permanent friction on the rotor is of semi-cylindrical shape in the direction of the axis of rotation of the rotor.

An advantage of the distributor of the present invention is that it provides complete leak-tightness with respect to the exterior and therefore allows constant isolation of the powder products from the outside atmosphere, from their introduction into the tank to their discharge.

A further advantage is that it allows the introduction and discharge of the powder products without a large differential pressure (3–10 bars) in plants operating at a pressure of 6–7 bars or at a steam pressure of high temperature of some 200° C. with a very small leakage rate.

A further advantage is that the distributor can be readily dismantled thereby facilitating its maintenance.

A further advantage is that it is possible to adjust the frictional force of each of the sealing members on the rotor as a function of the service pressure.

The rotary distributor of the present invention can be used in particular in the context of applications to foodstuffs, for instance applications relating to granulates or powder products.

Further characteristic features and advantages are set out in the following description made with reference to the accompanying drawings, given solely by way of non-limiting example.

Figure 1:
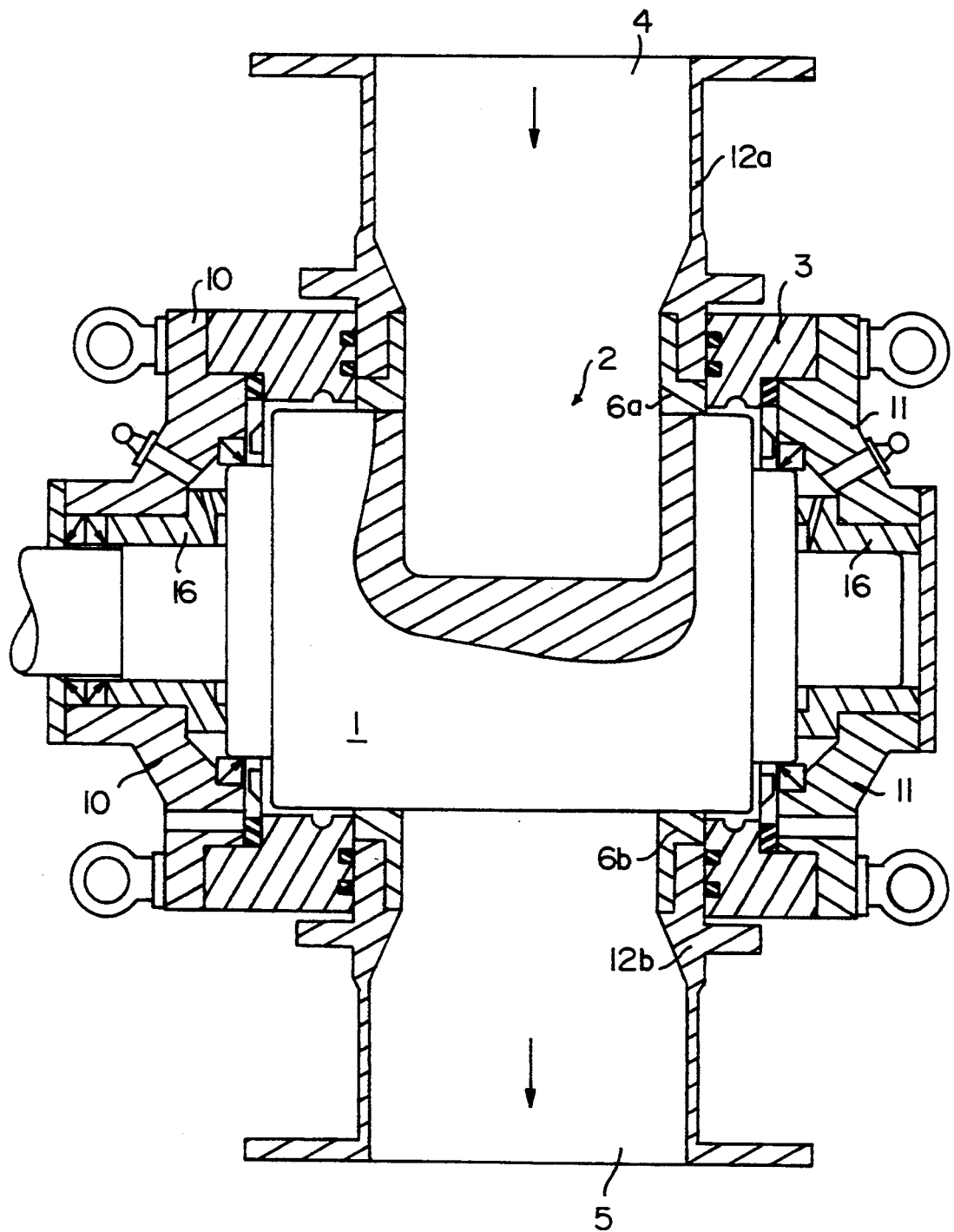
FIG. 1 is a front view in longitudinal section of the rotary distributor of the invention.
Figure 2:
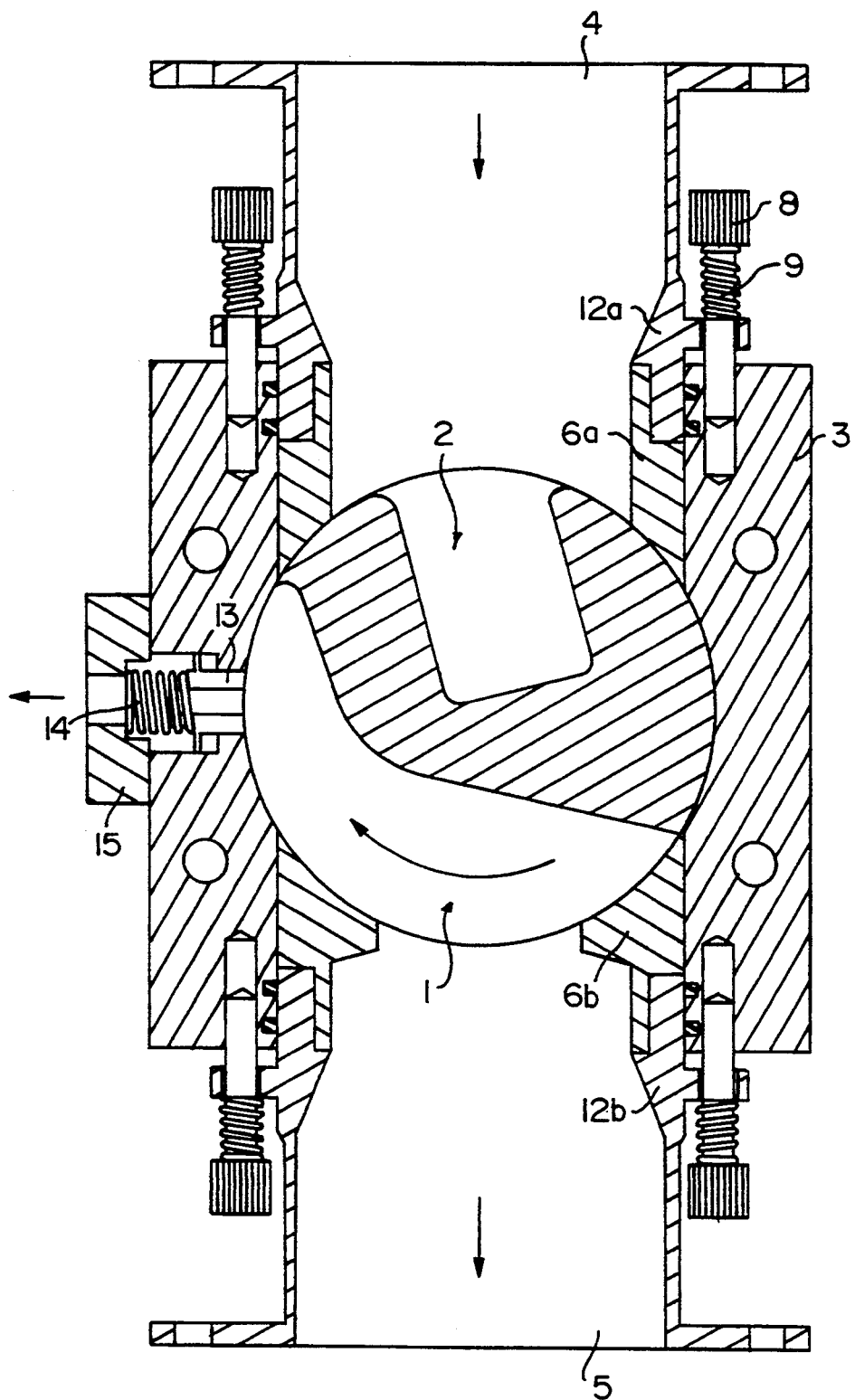
FIG. 2 is a side view in section of the rotary distributor.
Figure 3A:
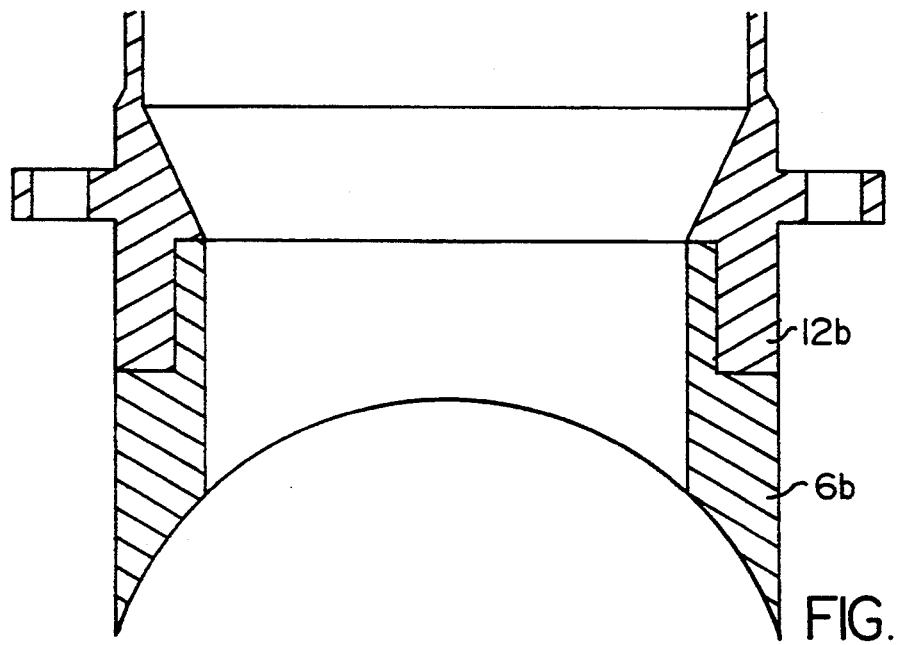
FIGS. 3a and 3b are respectively, a side view, and a view from below of an annular wear ring of the invention.
Figure 3B:
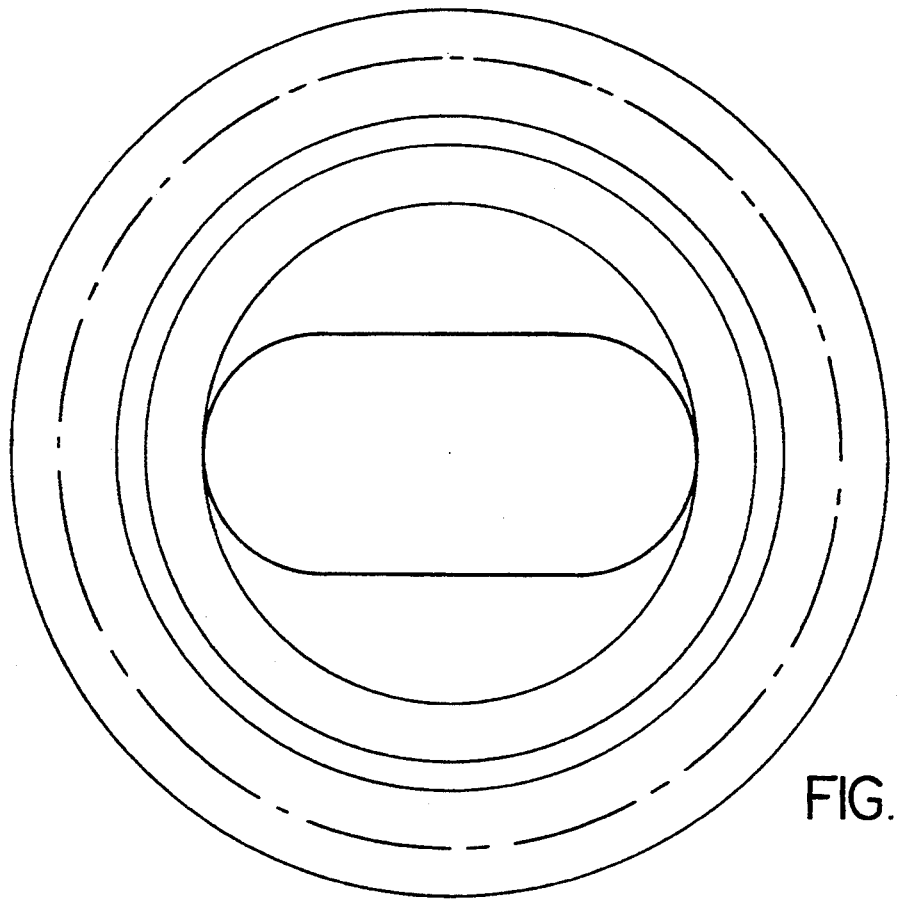

The rotary distributor shown in FIGS. 1 and 2 comprises a cylindrical rotor 1 which comprises at least one cell 2 which, as illustrated, is a cell compartment recessed in the rotor structure. The rotor may comprise one to three of such recessed cell compartments and may rotate, preferably, at a slow speed of approximately 5–100 revolutions per minute.

The rotor is disposed in a casing 3 which receives two end flanges 10 and 11. These flanges are coupled to rotary guide means 16 which may be formed by self-lubricating bearings or rings.

The cylindrical rotor 1 is mounted inside the casing 3 and is guided in rotation with respect to the casing by these self-lubricating bearings.

The rotation of the rotor with respect to the casing may be complete or only partial, for instance in the manner of a pendulum.

The rotation may be provided by a motor (not shown).

A supply sleeve 4 and a discharge sleeve 5 for a product, each formed by coupling flanges 12a or 12b, respectively, and sealing members 6a or 6b, respectively, are disposed across the casing in a sliding manner, preferably perpendicular to the axis of rotation of the rotor 1 at the location, respectively, of the supply opening and the discharge opening for the product.

These two sleeves are therefore movable and their position may be adjusted and fixed.

The two sealing members 6a and 6b, or wear rings, are mounted in permanent friction on the rotor. Their longitudinal axes are perpendicular to the axis of rotation of the rotor and the force of their friction on the rotor may be adjusted by means of adjustment means 8, 9 such as a screw and a compression spring (FIG. 2).

The materials forming the various members of the distributor of the invention may be selected as a function of the temperature of use of the distributor.

According to a particular embodiment of the distributor of the invention, the casing may be of stainless steel, for instance of the type Z 2 CN 18-10 which has been temperature stabilized.

The two end flanges 11 and 12 may be of stainless steel.

The self-lubricating bearings may be of polyimide (KINEL) or graphite or possibly of nitrided steel.

The rotor may be of stainless steel, for instance of the same type as the casing, and its outer surface may be stellited or nitrided and then rectified.

The cells of the rotor may be TEFLON-coated.

The casing may also comprise internal channels, making it possible to heat or cool the rotary distributor.

The inner bore of the casing, along the longitudinal axis of rotation of the rotor, is preferably formed so that it allows a certain clearance, which may be variable, of some 1/10 mm, this clearance being determined as a function, for instance, of the rotation of the rotor and/or of the temperature at which the distributor is used.

The casing may comprise two bores perpendicular to the longitudinal axis of rotation of the rotor, these bores receiving the supply or discharge sleeves 4 and 5. The two end flanges 10 and 11 may be coupled or secured, for example by bolting, to the distributor casing.

According to a variant, the casing may comprise vent openings making it possible to balance the pressures during the supply or discharge of the powder product in the recessed cell compartments 2 of the rotor.

The vent openings are provided in the casing and comprise an exhaust ring 13, a compression spring 14 and an exhaust flange 15.

The sealing members 6a and 6b are mounted inside the casing, over the whole periphery of the recessed cell compartments 2 of the rotor, in order to bear on the rotor and on the supply or discharge sleeves and to provide complete leak-tightness between the rotor, or more precisely the cells, and the supply or discharge sleeves with respect to the external atmosphere.

It is thus possible, by using the distributor of the invention, to isolate, in a constant or non-constant manner, each of the sleeves 10 and 11 in an alternating manner.

According to a particular embodiment, the sealing members are formed by two annular wear rings whose surface bearing against the supply or discharge sleeve is plane and whose surface in permanent friction on the rotor is of semi-cylindrical shape in the direction of the axis of rotation, or longitudinal direction, of the rotor. The wear rings may be of unfilled white PTFE or of polyimide.

According to further embodiments of the invention, the sealing members may be rings of square or oval section.

The means 8, 9 for adjusting the frictional force of the sealing members on the rotor, as a function of the service pressure, may be composed of an assembly of screws and calibrated springs.

The adjustment means 8, 9 are mounted so that the sealing members are movable in friction and so that the force applied to the rotor remains constant.

The connection with compensation produced by the sealing members thus ensures the leak-tightness of the distributor with respect to the external atmosphere.

I claim:

1. A rotary product distributor comprising:
    a casing enclosing a chamber and having an inlet bore opening to the chamber and an outlet bore opening from the chamber;
    a rotor member disposed in the chamber and mounted rotatably in the casing and having at least one recessed cell compartment formed therein and positioned for aligning with the inlet opening and then the outlet opening upon rotation of the rotor member to transport a material from the inlet opening to the outlet opening;
    two sleeve members, each of which comprises a coupling flange member and a seal member and wherein one sleeve member is positioned slidably in the casing to extend through the inlet opening for providing a product inlet into the chamber and the other sleeve member is positioned slidably in the casing to extend through the outlet opening for providing a product outlet from the chamber and wherein the seal member and coupling flange member of each sleeve member are positioned so that the seal member is positioned between the coupling flange member and the rotor member wherein each seal member has a surface portion configured and positioned for bearing on the rotor member; and
    means for mounting each coupling flange member to the casing adjustably for mounting each sleeve member slidably towards and away from the rotor member for adjusting a frictional force between each seal member and the rotor member.

2. A distributor according to claim 1 wherein the adjustable mounting means comprises a compression spring and means for securing together each coupling flange member, spring and casing.

3. A distributor according to claim 1 wherein the chamber and rotor member are cylindrical, wherein each seal member has a form of a tube, and wherein the seal member surface portion of each seal member for bearing on the rotor member is an arcuate surface for sealingly bearing on the rotor member.

4. A distributor according to claim 1 wherein the chamber and rotor member are cylindrical and wherein the inlet and outlet openings diametrically face each other in the chamber.

5. A distributor according to claim 1 further comprising pressure equalization means positioned in the casing aligned between the outlet opening and the inlet opening for venting the at least one cell compartment upon rotation of the rotor member from the outlet opening to the inlet opening.

6. A distributor according to claim 5 wherein the pressure equalization means comprises a tubular vent member which projects from a casing exterior vent opening through the casing to the chamber.

7. A distributor according to claim 6 wherein the tubular vent member is biased towards the rotor member.

8. A distributor according to claim 2 further comprising pressure equalization means in the casing aligned between the outlet opening and the inlet opening for venting the at least one cell compartment upon rotation of the rotor member from the outlet opening to the inlet opening.

9. A distributor according to claim 8 wherein the pressure equalization means comprises a tubular vent member which projects from a casing exterior vent opening through the casing to the chamber.

10. A distributor according to claim 9 wherein the tubular vent member is biased towards the rotor member.

11. In a rotary product distributor for continuously feeding discrete portions of powdered material comprising a casing enclosing a chamber and having inlet and outlet bore openings and a rotor member disposed in the chamber and rotatably mounted in the casing and having at least one recessed cell compartment positioned for transporting a material from a position aligned with the inlet bore opening to the outlet bore opening upon rotation of the rotor member, wherein the improvements comprise:
    two sleeve members, each of which comprises a coupling flange member and a seal member and wherein one sleeve member is positioned slidably in the casing to extend through the inlet bore opening for providing a product inlet into the chamber and the other is positioned slidably in the casing to extend through the outlet bore opening for providing a product outlet from the chamber and wherein the seal member and coupling flange member of each sleeve member are positioned so that the seal member is positioned between the coupling flange member and the, rotor member and wherein each seal member has a surface portion configured and positioned for bearing on the rotor member; and means for mounting each coupling flange member to the casing adjustably for moving each sleeve member slidably towards and away from the rotor member for adjusting a frictional force between each seal member and the rotor member.

12. A distributor according to claim 11 wherein the adjustable mounting means comprises a compression spring and means for securing together each coupling flange member, spring and casing.

13. A distributor according to claim 11 wherein the chamber and rotor member are cylindrical, wherein each seal member has a form of a tube, and wherein the seal member surface portion of each seal member for bearing on the rotor member is an arcuate surface for sealingly bearing on the rotor member.

14. A distributor according to claim 11 wherein the chamber and rotor member are cylindrical and wherein the and outlet openings diametrically face each other in the chamber.

15. A distributor according to claim 11 further comprising pressure equalization means positioned in the casing aligned between the outlet opening and the inlet opening for venting the at least one cell compartment upon rotation of the rotor member from the outlet opening to the inlet opening.

16. A distributor according to claim 15 wherein the pressure equalization means comprises a tubular vent member which projects from a case exterior vent opening through the casing to the chamber.

17. A distributor according to claim 16 wherein the tubular vent member is biased towards the rotor member.

18. A distributor according to claim 12 further comprising pressure equalization means in the casing aligned between the outlet opening and the inlet opening for venting the at least one cell compartment upon rotation of the rotor member from the outlet opening to the inlet opening.

19. A distributor according to claim 18 wherein the pressure equalization means comprises a tubular vent member which projects from a casing exterior vent opening through the casing to the chamber.

20. A distributor according to claim 19 wherein the tubular vent member is biased towards the rotor member.

* * * * *

UNITED STATES PATENT AND TRADEMARK OFFICE
CERTIFICATE OF CORRECTION

PATENT NO. : 5,405,062
DATED : April 11, 1995
INVENTOR(S) : Michel TORCHARD

It is certified that error appears in the above-indentified patent and that said Letters Patent is hereby corrected as shown below:

Column 2, line 59, "11 and 12" should be --10 and 11--.

Column 3, line 24, "cells" should be --recessed cell compartments 2--.

Signed and Sealed this

Twentieth Day of June, 1995

Attest:

BRUCE LEHMAN

Attesting Officer        Commissioner of Patents and Trademarks